United States Patent

Dickman

[15] 3,696,527
[45] Oct. 10, 1972

[54] CARD FEEDER FOR INSTRUCTIONAL DEVICES

[72] Inventor: John J. Dickman, Ferguson, Mo.

[73] Assignee: Missouri Research Laboratories, Inc., St. Louis, Mo.

[22] Filed: Aug. 30, 1971

[21] Appl. No.: 176,205

Related U.S. Application Data

[63] Continuation-in-part of Ser. No. 21,804, March 23, 1970, Pat. No. 3,645,012.

[52] U.S. Cl. .................................35/9 R, 271/35
[51] Int. Cl. .................................................G09b 3/00
[58] Field of Search........35/9 R; 271/34, 35, 64 MA; 40/78.07, 78.09; 270/52.5

[56] References Cited

UNITED STATES PATENTS

| 120,309 | 10/1871 | Miller | 40/78.09 X |
| 651,307 | 6/1900 | Harris | 271/35 |
| 2,110,980 | 3/1938 | Swift, Jr. | 271/35 |
| 3,231,266 | 1/1966 | Yow-Jiun Hu | 271/35 |
| 3,350,793 | 11/1967 | Bushnell | 35/9 R |
| 3,645,012 | 2/1972 | Fiehler et al. | 35/9 R |

Primary Examiner—Wm. H. Grieb
Attorney—Ralph W. Kalish

[57] ABSTRACT

A card feeder for instructional devices, such as teaching machines, wherein a card, the forward face of which, having inscribed question and multiple choice answers, is presented to the viewer and with the rearward face being suitably adapted for cooperating with a photoemissive source to effect requisite energization of indicators for signaling the correctness or incorrectness of the answer chosen; said feeder incorporating normally mutually contacting drive and driven belts adapted for effecting separation of inadvertently mutually adhering cards moving therebetween to assure feeding of a single card into viewing position for accuracy in energizing the appropriate indicators.

6 Claims, 9 Drawing Figures

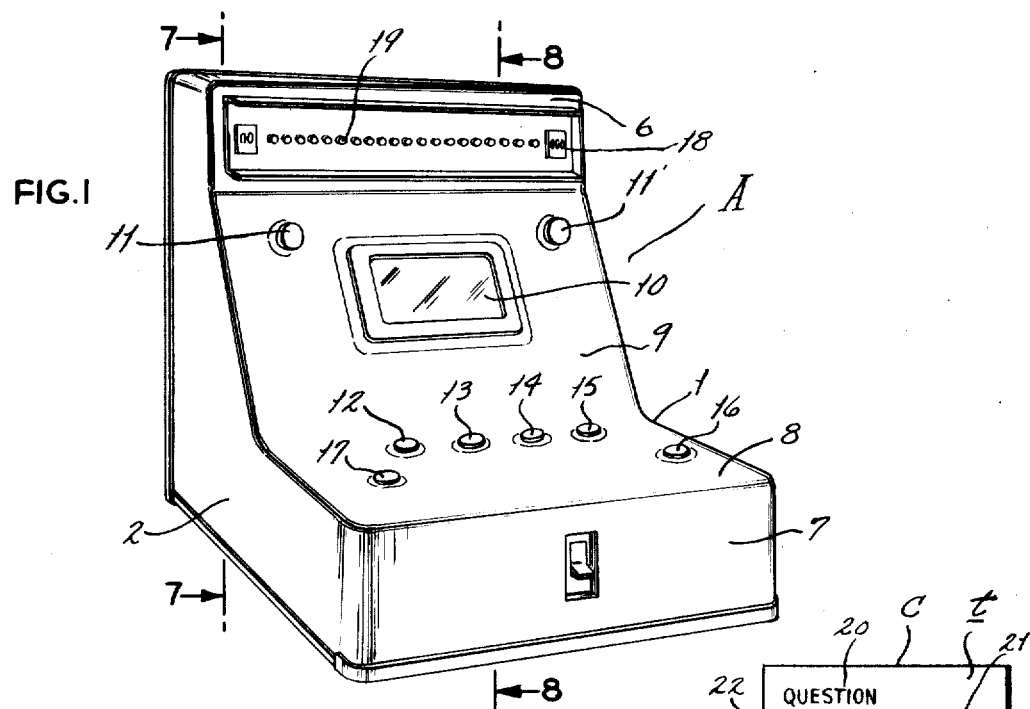
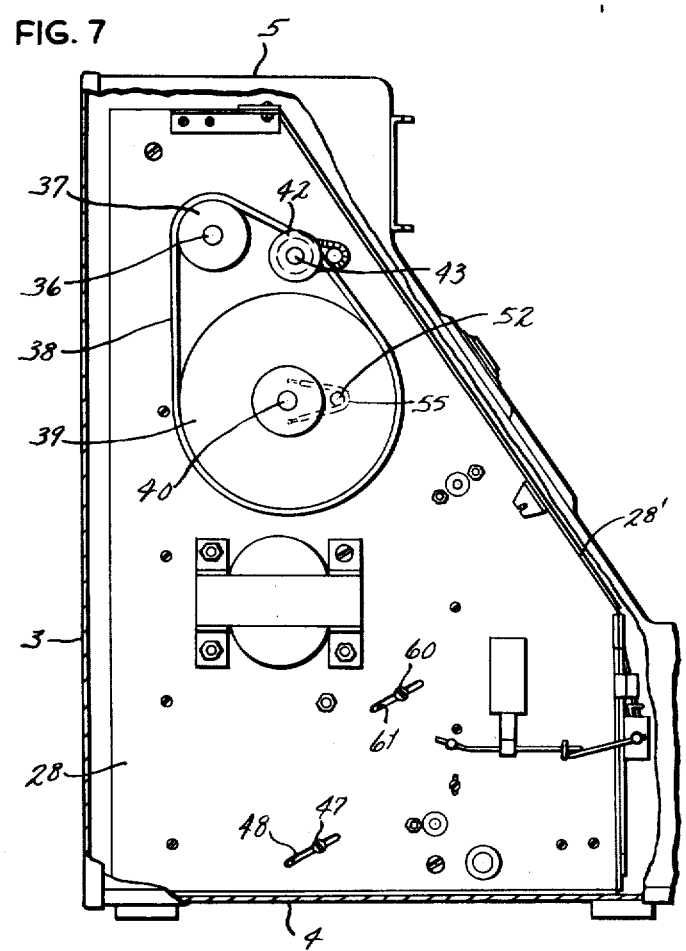
INVENTOR
JOHN J. DICKMAN
BY [signature]
ATTORNEY

INVENTOR
JOHN J. DICKMAN
BY Ralph N. Kalish
ATTORNEY

CARD FEEDER FOR INSTRUCTIONAL DEVICES

BACKGROUND OF THE INVENTION

This application is a continuation-in-part of application Ser. No. 21,804 filed Mar. 23, 1970, now U.S. Pat. No. 3,645,012, issued Feb. 29, 1972 upon an invention entitled Card Feeder For Instructional Devices.

This invention relates in general to visual training and instructional machines and, more particularly, to a card feeder therefor adapted to effect presentation of a single card into viewing position for instructional accuracy.

Heretofore, there has developed a relatively widespread usage of teaching machines which utilize cards for instructional purposes with the same being sequentially presented to the viewer upon the latter's operation of the machine. Such cards carry on the face presented to the viewer a question and multiple choice answers. The rearward face is adapted to cooperate with a photoemissive source, such as photoelectric cell, for effecting closure of the circuit to the signal, such as a light, for indicating the correct answer. Should the viewer actuate a control button for a circuit other than the one for the "correct" signal, a visual, as by a lamp, or an audible signal will be operated to indicate the erroneousness of the answer selected. Therefore, it is evident that for proper operation of the machine, there be no obstruction between the rearward face of the presented card and the photoemissive source so that the appropriate circuits will be closed. Quite often with card feeding systems currently used, cards tend to adhere to each other so that the forward face of one is presented to the machine user and the rearward face of the other is provided for co-ordination with he photoemissive source, whereupon the improper circuits will be closed and cause the viewer to obtain signals which do not indicate the true correctness or incorrectness of the answer chosen. Consequently, it has been a matter of serious concern with teaching machines utilizing cards that the mutual adherence of successive cards be prevented to assure that the machines at all times will not inadvertently cause erroneous instruction to the user.

SUMMARY OF THE INVENTION

It is an object of the present invention to provide a card feeder for use with instructional devices utilizing cards which will assure of the presentation of but a single card into viewing position so that the rearward face thereof will be properly positioned for circuit-making and breaking purposes.

It is another object of the present invention to provide an instructional device incorporating a card feeder comprising a marked simplicity of parts which coact in a novel manner for effectively separating any cards which may have become mutually adhered so that only one at a time is delivered for viewing.

It is a further object of the present invention to provide an instructional device incorporating a card feeder of the type stated which is reliable and durable in operation; which by its novel construction, is resistant to breakdown; and the use of which assures of a consistent accuracy of operation of the answer-indicating signals so as to provide maximum teaching effectiveness.

BRIEF DESCRIPTION OF THE DRAWINGS

FIG. 1 is a perspective view of an instructional device incorporating a card feeder constructed in accordance with and embodying the present invention.

FIG. 2 is a front view of a typical card utilized by the training device.

FIG. 3 is a rear view of a card for circuit closure to indicate the correctness of the first answer.

FIG. 4 is a rear view of a card adapted for circuit closure to indicate the correctness of the second answer.

FIG. 5 is a rear view of a card adapted for circuit closure to indicate the correctness of the third answer.

FIG. 6 is a rear view of a card adapted for circuit closure to indicate the correctness of the fourth answer.

FIG. 7 is a vertical section taken on the line 7—7 of FIG. 1.

DESCRIPTION OF THE PREFERRED EMBODIMENT

Figure 8:
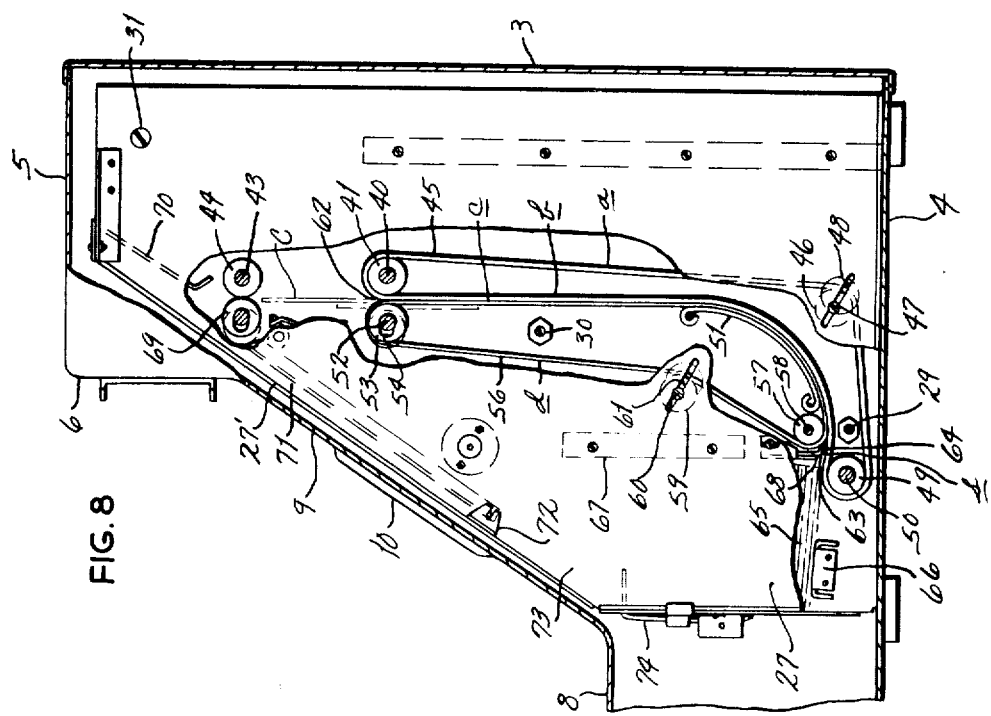
FIG. 8 is a vertical section taken on the line 8—8 of FIG. 1.
Figure 9:
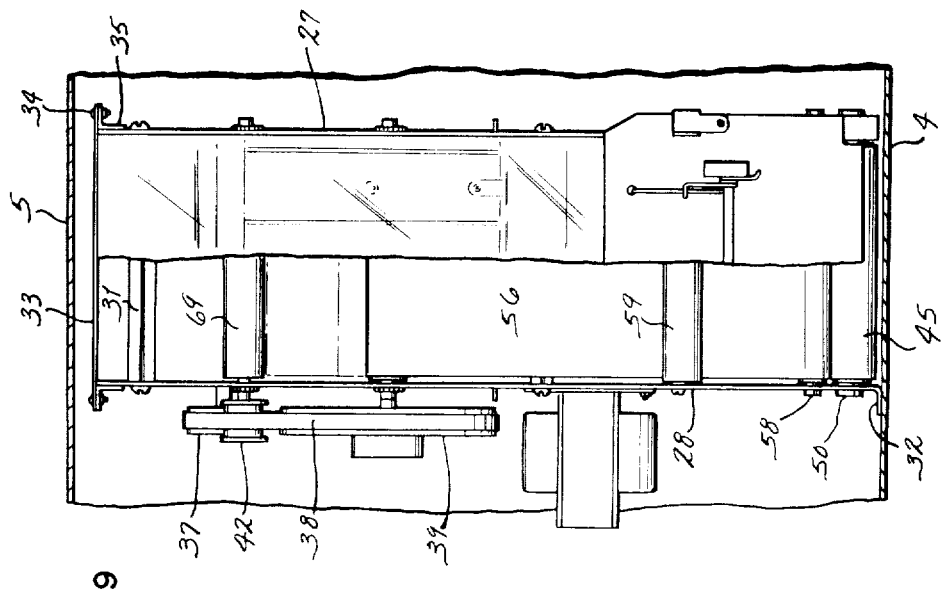
FIG. 9 is a front elevational view, partially broken away, illustrating the instructional device with the housing removed.

Referring now by reference characters to the drawings which illustrate the preferred embodiment of the present invention. A generally designates an instructional device such as a visual training machine or what is more commonly known as a "teaching machine" comprising a molded casing 1 having a pair of side walls 2, a back wall 3, a bottom wall 4, and a top wall 5 planar parallel to said bottom wall 4 but of relatively reduced depth. The front portion of said housing 1 comprises upper and lower vertical, transversely extending portions 6,7, there being a horizontal portion 8 at the upper end of said lower vertical portion 7 with a forwardly and downwardly inclined portion 9 continuous in its upper limit with upper vertical portion 6 and in its lower end with said horizontal portion 8. Said horizontal portion 8 constitutes a control panel while said inclined portion 9 constitutes a viewing and indicator panel. Centrally provided in said inclined portion 9 is a window 10 through which the user of the machine may view the forward face t of a card C, as will be described more fully hereinbelow. On opposite sides of said window 10 are indicator lights 11,11'. Horizontal portion 8 is provided with a multiplicity of answer selector push buttons 12, 13, 14, 15 which correspond to the number of answers; there also being control buttons 16, 17 for respectively controlling the change of cards C and the resetting of the machine A. Upper vertical portion 6 may be provided with suitable score and time elapse indicators, as indicated generally at 18, 19, respectively.

Turning to FIGS. 2, 3, 4, 5, and 6, it will be seen that the forward face 11 of each card C has inscribed thereon a question, as at 20, and multiple choice answers, indicated generally 21, which may be of any given number but herein are shown as being four in number, as at 22, 23, 24, 25 which will thus correspond to answer selector buttons 12, 13, 14, 15, respectively, so that if the user believes that the first answer, as at 22, is correct, he will depress button 12. The rear face 26 of each card C is suitably adapted for cooperating with a photoemissive source (not shown) provided within machine A for light impingement upon such rearward face 26 so as to cause the closure of the appropriate circuit if the user depresses the answer selector button which corresponds to the correct answer on card C. For purposes of example only, it will be seen that FIG. 3 illustrates the rearward face of a card C whereon the first answer, 22, is the correct one. FIG. 4 illustrates the rearward face of a card C where the correct answer is the second one, namely, as at 23. FIG. 5 shows the rearward face of a card C where the proper answer is the third one, as at 24; while FIG. 6 shows the rearward face of a card C where the right answer is the fourth one, as at 25. Should the user depress a selector button which does not correspond to the appropriate answer for the given card C, then the indicator light 11 will be illuminated indicating the incorrectness of the answer chosen. Should the user actuate the button corresponding to the correct answer, then by means of the pattern of the rearward face of the respective card cooperating with the photoemissive source, indicator lamp 11' will be illuminated and thus inform the user of the accuracy of his choice.

From the foregoing it is evident that each card C must be properly presented within machine A so as to assure of appropriate circuit closure upon actuation of the particular control button 12, 13, 14, 15, as the case may be, so as to reliably indicate whether the answer picked was correct.

The means for assuring of proper presentation of each card C will now be described.

Provided within housing 1 is a pair of parallel, horizontally spaced mounting plates 27,28 which are presented spacedly inwardly of the adjacent side wall 2 and are maintained in parallel relationship by means of a plurality of transversely extending spacers 29, 30, 31, suitably secured at their ends to said plates 27, 28. Each of said plates 27, 28 is fixed upon bottom wall 4 through means of a base flange 32 and at their upper ends are interconnected by a top plate 33, which latter is secured at its ends by screws 34 to mounting flanges 35 fixed to said plates 27, 28 adjacent their upper margins. The forward edges of plates 27, 27 in their upper portions are forwardly and downwardly inclined, as at 27',28' respectively, in parallel relationship to the plane of inclined portion 9 of housing 1. Provided adjacent the upper, outer portion of plate 28 is a prime mover (not shown) having a drive shaft, as indicated at 36, which projects toward plate 28 and mounts a gear 37 about which is trained an endless transmission belt 38 which progresses downwardly from gear 37 for disposition about a gear 39 of relatively increased diameter and which is carried on one end of a shaft 40 which is journalled in suitable bearings (not shown) provided in plates 27,28, for extension of said shaft 40 therebetween. Shaft 40 mounts a roller 41 for purposes presently appearing. From gear 39 said belt 38 continues upwardly for engaging a gear 42 mounted on the end of a shaft 43 which shaft is also journalled in bearings (not shown) formed in plates 27,28 for extension therebetween, said shaft 43 being substantially directly vertically upwardly of shaft 40. Between plates 27,28, shaft 43 mounts a roller 44.

Between plates 27, 28 there is trained about roller 41 the upper portion of an endless conveyor belt 45, the rearward course of which, indicated at $a$, is led about a tensioning roller 46 mounted upon a shaft 47 which is journalled at its ends within narrow rearwardly and downwardly inclined slotlike bearings 48 to provide a floating arrangement so that said roller 46 will be biased through gravity into effecting a suitable tension upon said belt 45. Belt 45 is directed from roller 46 about guide roller 49 mounted upon a shaft 50 journalled in openings (not shown) in plates 27, 28 proximate the lower edge of the said related plates and forwardly and slightly downwardly of roller 46. The course of belt 45 between rollers 41, 49, being the forward course and indicated at $b$, is subjected to an arcuate or convex belt guide 51, fabricated preferably of nylon or the like, located rearwardly of roller 49 and slightly thereabove thus causing the portion of belt 45 immediately above roller 49 to assume a substantially forwardly concave formation and being thence vertical thereabove.

Presented immediately forwardly of roller 41 in axial parallel relationship thereto is an idler shaft 52, carrying a roller 53 of like character as roller 41; the ends of shaft 52 being received in bearings 54 of slightly greater width than the diameter of said shaft 52 so as to allow for requisite adjustment for purposes which will be evident hereinbelow. Engaged about one end portion of shaft 52 is a coil spring 55 being bent in generally U-shape formation and with its opposite ends affixed to the inner face of plate 28 above and below shaft 40 for urging shaft 52 toward shaft 40. Trained about roller 53 is the upper end of an endless idler or driven belt 56, the rearward course of which, as indicated at $c$, is in normal face to face engagement with the confronting course $b$ of driving belt 45. The said rearward cource $c$ thus contacts, on its opposite face, belt guide 51; there being a lower roller 57 suitably carried upon an idler shaft 58 extending between walls 27, 28 slightly upwardly and rearwardly of roller 49 for disposition thereabout of the lower end of said belt 56. A tensioning roller 59 engages the forward course of belt 56, as indicated at $d$, between rollers 53 and 57 for maintaining a desired degree of tension; said roller 59 carrying pins 60 at its opposite ends which project through elongated inclined slots 61 in said plates 27, 28 on providing the desired range of adjustability.

It will thus be seen that driving belt 45 is operated by means of the prime mover (not shown), while belt 56 is caused to normally travel with belt 45 through frictional engagement developed therebetween by the contact of their confronting courses $b$ and $c$. Said courses define a path of travel therebetween terminating at its upper end as at 62, between rollers 41, 53, and at its lower end, as at 63, said latter constituting an entry aligned with roller 57 which is rearwardly of a short extent of belt 45 above and slightly rearwardly of roller 49, as indicated broadly at 64.

Provided between plates 27, 28 in their forward lower portion is a card bin or receptacle, indicated at 65, the lower end of which incorporates a transverse support 66 which is forwardly and upwardly of roller 49 but being rearwardly and downwardly inclined so as to direct the lowermost card C in the reservoir for engagement on its under rearward edge portion upon section 64 on belt 45. The rearward portion of bin 65 is defined by a wall-forming member, designated 67, the lower end portion of which is provided with a card detent 68 terminating immediately above section 64 of belt 45 with the intervening distance substantially equivalent to the thickness of a card C. The lower end extremity of detent 68 constitutes a card-arresting edge $s$ for purposes presently appearing. As may best be seen in FIG. 8, cards C are stacked on above the other in bin 65 with the rearward face presented downwardly. Upon operation of control button 16 by conventional circuitry and electromechanical components, the bottommost card C in bin 65 will be moved rearwardly beneath edge $s$ for reception upon belt section 64 for being carried therealong through entry 63, between courses $b,c$, of said belts 45, 56, respectively, for ultimate delivery through, and upwardly of, belt terminus 62.

Roller 44 is so spaced above roller 41 that the same will engage the upper rearward face portion of card C so that said roller 44 in conjunction with a juxtaposed idler roller 69 will cause the particular card C to be carried upwardly thereabove for disposition upon an inclined surface 70 from whence the now-ejected card will slide forwardly and downwardly in a card chute 71 mounted between plates 27, 28, the lower portion of which is aligned with viewing window 10 in housing 1 so that that the forward face of card C will be presented to the viewer. Thereupon the latter will depress the chosen answer selector button 12, 13, 14 or 15, as the case may be, and thereby energize the particular circuits as developed through the coaction of the photoemissive source (not shown) within device A so as to cause either signal 11, or 11', as appropriate, to be activated. Provided at the lower end of card chute 71 is a stop member 72 which, upon the next depression of card change control button 16, will permit the erstwhile viewed card C to descend into a card collecting zone, as indicated at 73, for deposit of each viewed card pending operation of control button 17 which will operate means, designated generally at 74, (not shown), not forming a part of this invention, to permit the cards to descend into card bin 65 for consequent viewing.

Should two adjacent cards in reservoir or bin 65 become mutually adhered, as by static electricity, dirt, etc., and the same be delivered to belt section 64 for presentation to belts 45,56; the unique character of said belts will effectively and reliably conduce to the separation of such cards assuring the ultimate delivery of but a single card to the viewing position.

Belts 45 and 56 are suitably treated so that their confronting surfaces each have a different coefficient of friction. The surface of belt 45 will have a higher coefficient of friction than belt 46 and thus is fabricated of material suitable to effect such differential. Admittedly, the differential may be easily achieved by a facile selection of well-known materials. However, for purposes of example only, it has been found that belt 45 may be fabricated of multi-ply cotton and with the surfaces thereof treated with a tacky-producing composition such as, polyvinylchloride which may be easily applied by spraying. The resulting surface thus will suitably tacky or otherwise friction-producing. To provide the desired relationship, belt 56 may, for example only, be of multi-ply cotton construction but having its surfaces polished in accordance with well-known techniques. Thus, the difference in coefficient of friction between the treated surface of belt 45 and the polished surface of belt 56 is indeed suitable in the present instance. It is apparent that synthetic rubbers, urathenes, etc., may be utilized for purposes of belt 46.

In addition to establishing the prescribed relationship between belts 45,56 it is also requisite that, desirably, each of said belts have a higher coefficient of friction than that of the cards C being conveyed.

Thus, with the foregoing construction in mind, the capability of machine A to effect separation of mutually adhered cards should now become apparent. Normally, a single card C will have one face in friction-establishing engagement with course $b$ of belt 45 and thus be dragged, as it were, therealong since belt 56 with its polished surface would not tend to restrain such movement. Card C would be easily delivered to the upper end of a conveyor system. In the event adhering cards were directed between belts 45,56 the card adjacent belt 45 would be pulled thereby and slip or slide, as it were, away from the adhering card by reason of the coefficient of friction of belt 45 being greater than that of the cards. Once the card proximate belt 45 had been pulled clear of the other card, then the latter would be disposed for engaging belt 45 for conveyance thereby. It is evident that the relationship between the contactive surfaces of belts 45,56 and between the same and the cards as well as between the cards themselves has been so developed as to assure of reliable separation of any cards that might have become mutually adhered.

Furthermore, the action of card-arresting edge $s$ must also be observed since the same does provide a very unique function. Said edge $s$ is sufficiently close to the underlying surface of belt section 64 so that if two cards are presented therebetween said edge will effect a downward pressure upon belt 45 by reason of the limited character of the intervening passage. Thus by such pressure a holding of the uppermost card will be effected with the lower card, being forced more snuggly onto belt 45 with its relatively high coefficient of friction for conducing for ready separation of the cards as the bottom card will slide past the card engaging with the edge $s$.

In view of the foregoing it is to be seen that machine A thus provides two means for assuring that only single cards are delivered to the viewer and thereby overcome the defects which have been common in machines of this type heretofore.

Thus, the present invention is designed to separate cards which are adapted to form a part of the operating circuitry of the structure to make certain that the appropriate indicators are actuated for the intended instructional purpose.

By the foregoing novel construction, there is obviated the possibility of two cards traveling simultaneously to the viewing position in which contingency the forward face 11 of one would be presented to the viewer with the rearward face of the other being exposed to the photoemissive source for causing an inaccurate and misleading circuit closing operation as above described.

It is also important to note that by utilization of cooperating belts having surfaces with a predetermined relationship as to the respective coefficients of friction, cards of any type may be utilized. Thus, the user of machine A is not restricted to a specific type of card but may freely use any such card as may be readily available from a most convenient source. Numerous of the teaching machines of the present time require specially prepared cards, but this requirement is obviated in the present invention by reason of the novel character of the cooperating belts.

It should be understood that changes and modifications in the formation, construction, and arrangement and combination of the several parts of the Card Feeder For Instructional Devices may be made and substituted for these herein shown and described without departing from the nature and principle of my invention.

Having thus described my invention, what I claim and desire to obtain by Letters Patent is:

1. In an instructional machine having a housing with a window provided therein for viewing therethrough the forward, intelligence-bearing face of a card, signal means, circuit means connected to said signal means, and a circuit determining pattern provided on the rear face of said card, the improvement comprising means defining a reservoir for cards to be sequentially presented to the window, a driving conveyor belt provided in said housing, drive means mounted in said housing for effecting vertical travel of said driving conveyor belt, a driven conveyor belt provided in said housing in confronting, normally contacting relationship to said driving conveyor belt and being in contiguity therewith for travel pursuant to movement of said driving conveyor belt, means for delivering a card from said reservoir to said driving conveyor belt for travel between the confronting portions of said driving and driven conveyor belts toward said window, the coefficient of friction of the contacting surface of said driving conveyor belt being different from that of the confronting surface of said driven conveyor belt.

2. In an instructional machine having a housing with a window provided therein for viewing therethrough the forward, intelligence-bearing face of a card, signal means, circuit means connected to said signal means, and a circuit determining pattern provided on the rear face of said card, the improvement as defined in claim 1 and further characterized by said driving belt having its contacting surface with a greater coefficient of friction than the confronting surface of said driven conveyor belt.

3. In an instructional machine having a housing with a window provided therein for viewing therethrough the forward, intelligence-bearing face of a card, signal means, circuit means connected to said signal means, and a circuit determining pattern provided on the rear face of said card, the improvement as defined in claim 2 and further characterized by the coefficient of friction of the surfaces of said card being less than those of the confronting portions of said driving and driven conveyor belts.

4. In an instructional machine having a housing with a window provided therein for viewing therethrough the forward, intelligence-bearing face of a card, signal means, circuit means connected to said signal means, and a circuit determining pattern provided on the rear face of said card, the improvement as defined in claim 1 and further characterized by said contacting surface of said driving conveyor belt being relatively tacky and the confronting surface of said driven conveyor belt being relatively smooth.

5. In an instructional machine having a housing with a window provided therein for viewing therethrough the forward, intelligence-bearing face of a card, signal means, circuit means connected to said signal means, and a circuit determining pattern provided on the rear face of said card, the improvement as defined in claim 1 and further characterized by card-arresting edge member presented said reservoir for said cards and the mutually engaged driving and driven conveyor belts.

6. In an instructional machine having a housing with a window provided therein for viewing therethrough the forward, intelligence-bearing face of a card, signal means, circuit means connected to said signal means, and a circuit determining pattern provided on the rear face of said card, the improvement as defined in claim 1 and further characterized by the confronting surface of said driving conveyor belt being treated with polyvinylchloride and the opposed surface of said driven conveyor belt being polished.

* * * * *